Figure 3:
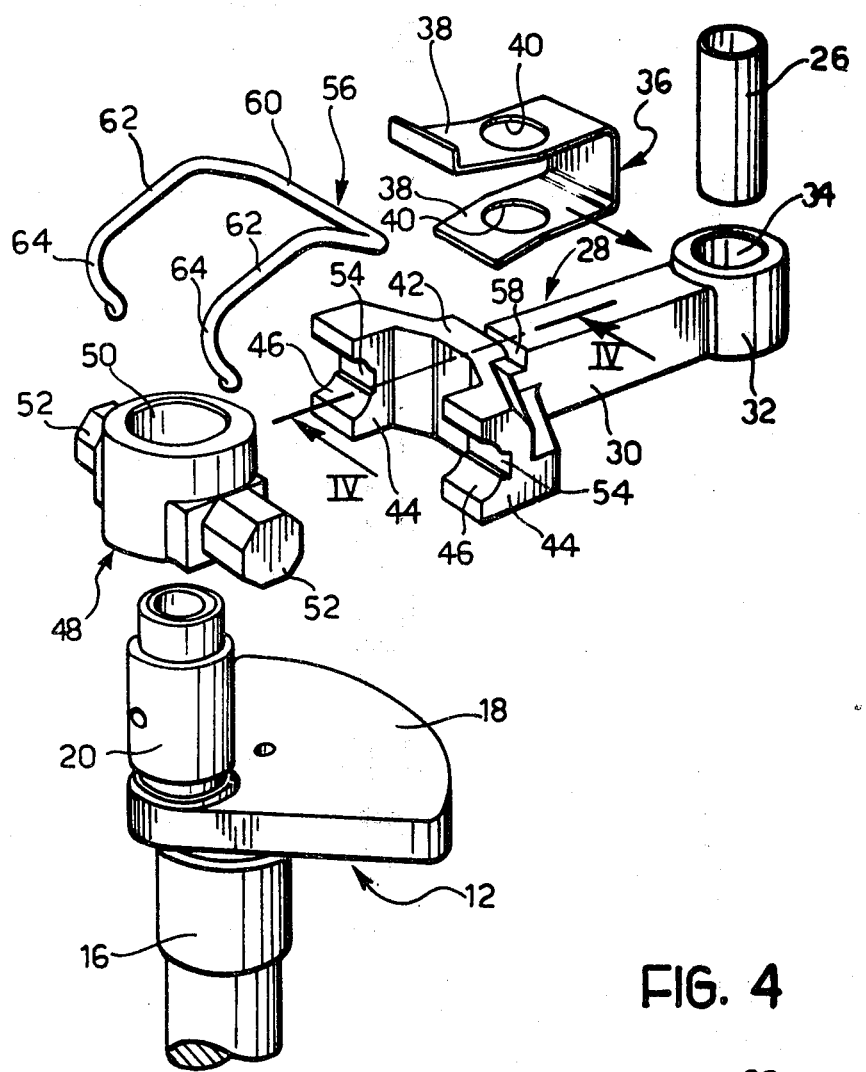

United States Patent [19]

Andrione et al.

[11] 4,407,168
[45] Oct. 4, 1983

[54] CRANK MECHANISM FOR SMALL, SINGLE-CYLINDER, RECIPROCATING ENGINES, PARTICULARLY REFRIGERATOR COMPRESSORS

[75] Inventors: Norbert Andrione; Federigo Peruzzi, both of Turin, Italy

[73] Assignee: Aspera S.p.A., Castelnuovo Don Bosco, Italy

[21] Appl. No.: 272,237

[22] Filed: Jun. 10, 1981

[30] Foreign Application Priority Data

Jun. 20, 1980 [IT] Italy ............................ 67969 A/80

[51] Int. Cl.³ ............................................. G05G 1/00
[52] U.S. Cl. ................................................ 74/579 E
[58] Field of Search ............... 74/579 E, 597, 598; 105/84

[56] References Cited

U.S. PATENT DOCUMENTS 2,846,897  8/1958  Schall ............................... 74/579 E
3,144,786  8/1964  Dale ................................. 74/579 E
3,971,355  7/1976  Kottmann ......................... 74/579 E

*Primary Examiner*—Patrick D. Lawson
*Attorney, Agent, or Firm*—Sughrue, Mion, Zinn, Macpeak and Seas

[57] ABSTRACT

The crankshaft of a crank mechanism has a projecting crank pin which is connected to an eye at the big-end of a connecting rod. An eye at the little-end of the connecting rod is connected to a gudgeon pin attached to the piston, being slidable axially of the gudgeon pin and being kept centered relative to the piston by resilient means. The eye at the big-end of the connecting rod is defined by a bush which is rotatably connected with the crank pin and has a pair of diametrically-opposing pins. The end of the connecting rod associated with the big-end is fork-shaped, and the arms of the fork are each articulated to one of the pins about a pivot axis which is perpendicular to both the axis of the crank pin and the longitudinal axis of the connecting rod.

3 Claims, 4 Drawing Figures

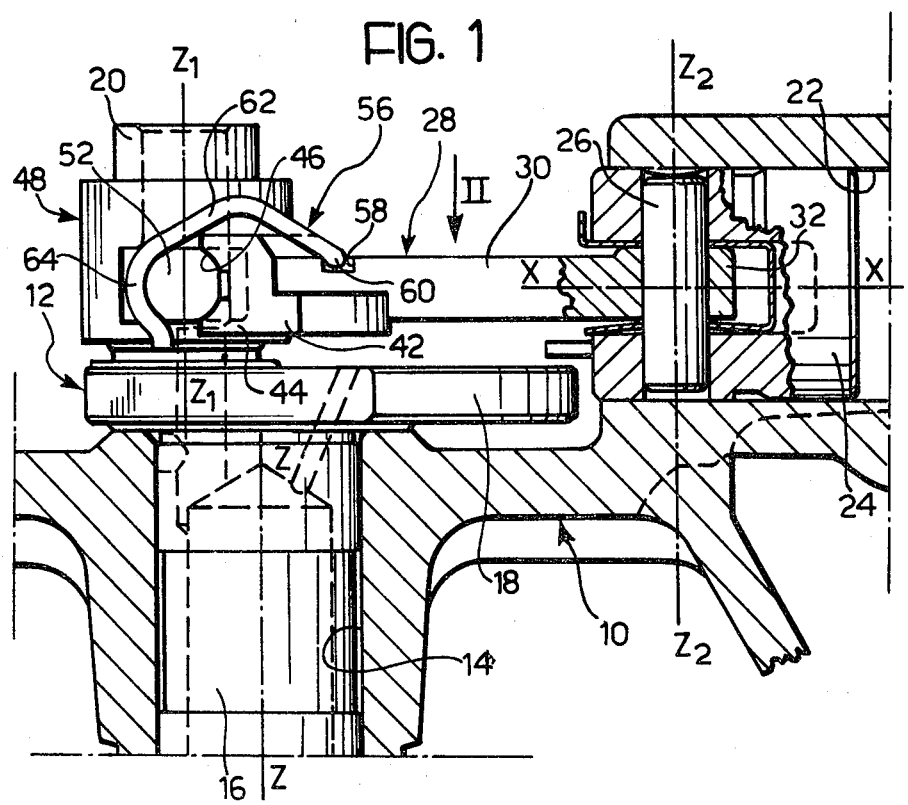
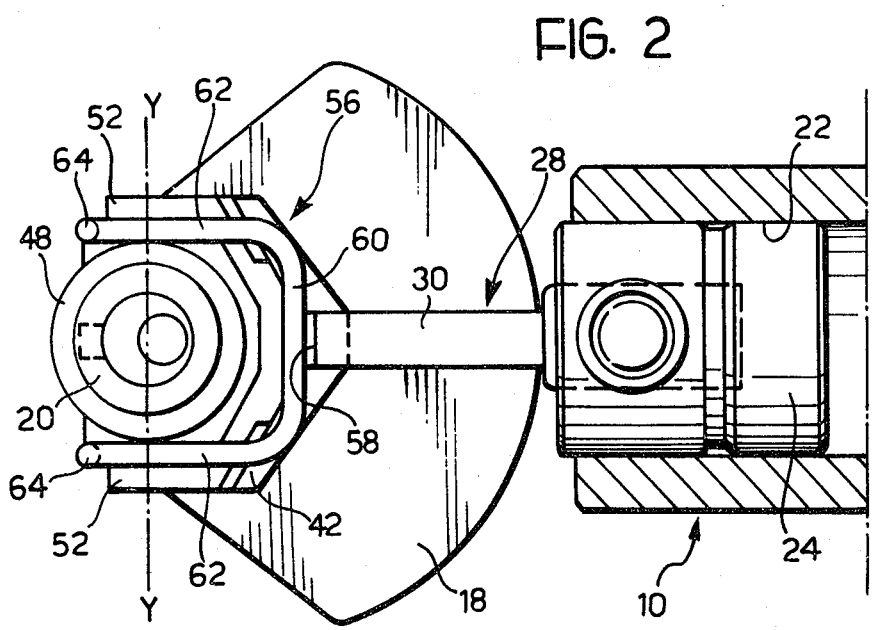

CRANK MECHANISM FOR SMALL, SINGLE-CYLINDER, RECIPROCATING ENGINES, PARTICULARLY REFRIGERATOR COMPRESSORS

The crankshaft of a crank mechanism has a projecting crank pin which is connected to an eye at the big-end of a connecting rod. An eye at the little-end of the connecting rod is connected to a gudgeon pin attached to the piston, being slidable axially of the gudgeon pin and being kept centred relative to the piston by resilient means. The eye at the big-end of the connecting rod is defined by a bush which is rotatably connected with the cranck pin and has a pair of diametrically-opposing pins. The end of the connecting rod associated with the big-end is fork-shaped, and the arms of the fork are each articulated to one of the pins about a pivot axis which is perpendicular to both the axis of the crank pin and the longitudinal axis of the connecting rod.

The present invention relates to a crank mechanism for small, single-cylinder, reciprocating machines in which the crankshaft has a projecting crank pin coupled to an eye at the big-end of a connecting rod, an eye at the little-end of the latter being coupled to a gudgeon pin attached to a piston, and in which the eye at the little-end is slidable axially of the gudgeon pin and is kept centred relative to the piston by resilient means.

A known arrangement of this kind is used traditionally in small compressors for refrigerators. In these machines, the crankshaft is vertical, with its crank pin overhead, while the cylinder is horizontal. In the piston cavity, where the little-end of the connecting rod is connected to the gudgeon pin, there is a sprung U-bolt which grips the little-end of the connecting rod and has arms with respective holes through which the gudgeon pin extends. The sides of the spring are stretched apart so as to engage the skirt of the piston resiliently and keep the little-end of the connecting rod centred, the eye of the latter being slidable on the gudgeon pin. This arrangement compensates to a certain extent for misalignment of the cylinder axis.

Notwithstanding the resilient mounting of the eye at the little-end of the connecting rod within the piston, it is still necessary in known small compressors of the aforementioned type to observe strict working tolerances with regard to the reciprocal arrangement of the crankshaft and cylinder axes, which should as far as possible be perpendicular to one another. In fact, despite the fact that the little-end of the connecting rod may oscillate along the gudgeon pin, the angular oscillations of the connecting rod are limited by the clearances with which its eyes are connected to the gudgeon pin and the crank pin respectively. In short, the resilient mounting of the big-end of the connecting rod forms little more than a useful device to simplify assembly, and does not allow appreciable economies to be effected when grinding the cylinder and the main bearings for the crankshaft, since the perpendicularity between the cylinder axis and the axis of the crankshaft should be as near perfect as possible.

The main object of the present invention is to provide a crank mechanism of the type mentioned initially, in which the axes of the cylinder and the crankshaft do not have to meet rigorous alignment and perpendicularity requirements, with resultant economy in manufacturing costs.

The present invention achieves this object by means of a crank mechanism of the above mentioned type, characterised in that the eye at the big end of the connecting rod is defined by a bush which is rotatably coupled to the crank pin and has a pair of diametrically-opposing pins, and in that the end of the connecting rod corresponding to the big-end is fork-shaped, and the arms of the fork are each articulated to one of the pins about a pivot axis which is perpendicular to both the axis of the crank pin and the longitudinal axis of the connecting rod.

Thanks to this innovation, even when the perpendicularity and alignement of the cylinder axis with the crankshaft axis are not precise, these defects are allowed for by the ability of the stem of the connecting rod to oscillate relative to the eye at its big-end.

Preferably, each arm of the fork has a cradle with a cylindrical surface, which is open in the opposite direction to the piston and within which a respective articulation pin of the bush is received, and each pin is held in engagement with the cradle by a spring clip which engages the pin in a position opposite the cradle, and is restrained on the connecting rod.

This type of mounting is advantageous, since it enables mechanised tooling to be used when assembling the bush and the fork.

The invention is not restricted solely to refrigerator compressors, since the cranck mechanism is applicable to other small reciprocating machines.

Figure 4:
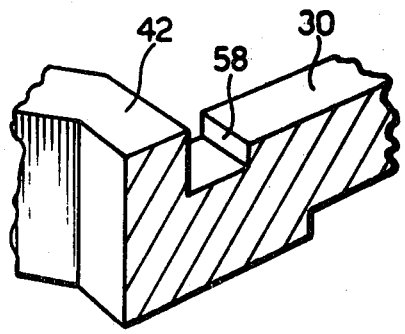

The invention will be better understood by reading the detailed description which follows, with reference to the attached drawings, which are given by way of non-limiting example and in which:

FIG. 1 is a fragmentary vertical section through a small refrigerator compressor, FIG. 2 is a fragmentary plan view on arrow II, with the compressor cylinder sectioned horizontally, FIG. 3 is an exploded perspective view of the crank mechanism, and FIG. 4 is a fragmentary sectional view taken, on an enlarged scale, along the line IV—IV in FIG. 3.

With reference to the FIGS. 1 and 2, a small compressor for a refrigerator includes a casing 10 in which main bearings for a crankshaft 12 are machined along a vertical axis. FIG. 1 shows only the upper main bearing 14, which is connected with a main journal 16 of the shaft 12. The vertical axis of rotation of the shaft 12 is shown by Z-Z. Above the casing 10, the crankshaft 12 has the usual balance weight 18, which is succeeded upwardly by a cranck pin 20 mounted so as to overlie the main bearing 14. The vertical axis of the crank pin 20 is shown by $Z_1$-$Z_1$.

A cylinder 22 is machined in an upper part of the casing 10. The axis of cylinder 22, indicated X-X, is horizontal and, in theory at least, intersects the axis Z-Z. A piston 24 is slidable in the cylinder 22 and is provided with a gudgeon pin 26 having a vertical axis $Z_2$-$Z_2$. The crank pin 20 and the gudgeon pin 26 are interconnected by a connecting rod, generally indicated 28.

The description will now refer to FIG. 3 as well as to FIGS. 1 and 2. In FIG. 3, those parts which appear in FIGS. 1 and 2 have been shown with the same reference numerals.

The connecting rod comprises a stem 30 which is formed with a little-end 32. The little-end 32 is inserted into a cavity of the piston 24, and its eye 34 is slidably and rotatably attached to the gudgeon pin 26. The little-end 32 is gripped within the cavity of the piston 24 by a spring U-bolt 36 having two resilient arms 38 with respective holes 40 for the gudgeon pin 26. The two arms 38 are shaped so as to abut the walls of the cavity of piston 24, keeping the little-end 32 of the connecting rod 28 elastically centred in the cavity of piston 24.

Cast in one piece with the stem 30 of the connecting rod 28 is a fork 42 having two arms which are indicated 44. Each of these arms has a cradle 46 with a cylindrical surface, and the two cradles 46 are aligned transversely of the connecting rod 28, being open towards the crank pin 20, that is, in the opposite direction to the piston 24.

A bush 48 is associated with the crank pin 20, being rotatably connected with the pin by means of its eye 50. The bush 48 has a pair of diametrically-opposing pins 52, each of which is engaged rotatably in a respective cradle 46 of the fork 42. The axis of articulation between the pins 52 and the cradles 46 is indicated Y-Y in FIG. 2, and is perpendicular to both the axis $Z_1$-$Z_1$ of the crank pin 20 and the longitudinal axis of the connecting rod 28. As can be seen in FIG. 3, grooves 54 are cut in the cylindrical surface of the cradle 46 while the pins 52, not being completely cylindrical, have facets. These allow good lubrication of the rotary coupling between the pins 52 and the cradles 46 by forming channels which may be penetrated, in the known manner, by oil sprayed from the upper end of the crankshaft 16.

The coupling between the pins 52 and the respective cradles 46 is maintained by a spring clip 56 which is formed by a substantially U-shaped wire element. As can be better seen in FIG. 4, a notch or groove 58 is made in the stem 30 of the connecting rod 28, adjacent the fork 42, for engagement by the yoke or transverse part 60 of the clip 56. Both arms 62 of the clip 56 are curved inwards at their ends 54, so as to clasp of the pins 52 and hold it in its cradle 46.

It will be appreciated that the assembly of the connecting rod 28 and the bush 48 by means of the spring clip 56 is extremely simple because, after the pins 52 have been engaged in the cradles 46, it is necessary only to insert the yoke 60 of the clip 56 into the notch 58 and then snap-engage the two curved end parts 64 with the pins 52, according to the arrangement illustrated in FIG. 1. With the appropriate tools, this assembly operation lends itself to mechanisation.

It will be understood that a connecting rod such as that shown in the drawings is able, within wide limits, to allow for a lack of perpendicularity between the axis X-X on the one hand, the axes Z-Z and $Z_1$-$Z_1$ on the other hand, as well as allowing for misalignments between the axes Z-Z, $Z_1$-$Z_1$ and $Z_2$-$Z_2$, by virtue of its articulation about the axis Y-Y. This enables grinding of the main bearings such as 14, the cylinder 22, the journals such as 16, the crank pin 20, the gudgeon pin 32, and also the eyes 50, 34 of the connecting rod, to be carried out without having to meet high accuracy requirements, thereby effecting economies.

We claim:

1. In crank mechanism for small, single-cylinder, reciprocating machines in which the crankshaft has a projecting crank pin coupled to an eye at the big-end of a connecting rod, an eye at the little end of the latter being coupled to a gudgeon pin connected to a piston, and in which the eye at the little-end is slidable axially of the gudgeon pin and is kept centred relative to the piston by resilient means, the improvement wherein the eye at the big-end of the connecting rod is defined by a bush which is rotatably coupled to the crank pin and has a pair of diametrically-opposing pins, and wherein the end of the connecting rod associated with the big-end is fork-shaped, and the arms of the fork are each articulated to one of the pins about a pivot axis perpendicular to both the axis of the crank pin and the longitudinal axis of the connecting rod.

2. The crank mechanism as claimed in claim 1, wherein each arm of the fork has a cradle with a cylindrical surface, which is open in the opposite direction to the piston and within which a respective pivot pin of the bush is received, and wherein each pin is held in engagement with the cradle by a spring clip which engages the pin in a position opposite the cradle, said spring clip being restrained on the connecting rod.

3. The crank mechanism as claimed in claim 2, wherein the spring clip is formed by a substantially U-shaped wire element said spring clip having a yoke which is engaged in a notch cut in the stem of the connecting rod adjacent the fork and said spring clip having branches each of which is curved inwards at its end so as to clasp one of the pins with snap-engagement and hold the pin in its respective cradle.

* * * * *